(12) United States Patent
Doh et al.

(10) Patent No.: US 7,218,865 B2
(45) Date of Patent: May 15, 2007

(54) BURST-MODE OPTICAL RECEIVER OF DIFFERENTIAL OUTPUT STRUCTURE

(75) Inventors: Hee-Chan Doh, Suwon-shi (KR); Hyeon-Cheol Ki, Seoul (KR); Yun-Je Oh, Yongin-shi (KR); Gil-Yong Park, Suwon-shi (KR); Tae-Sung Park, Suwon-shi (KR); Shin-Hee Won, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 634 days.

(21) Appl. No.: 10/413,979

(22) Filed: Apr. 15, 2003

(65) Prior Publication Data

US 2003/0194244 A1    Oct. 16, 2003

(30) Foreign Application Priority Data

Apr. 15, 2002    (KR)    ...................... 10-2002-0020489

(51) Int. Cl.
*H04B 10/06*    (2006.01)
(52) U.S. Cl. .................... 398/202; 330/308; 250/214 A
(58) Field of Classification Search ................ 398/202; 330/308; 250/214 A, 214 AG
See application file for complete search history.

(56) References Cited

U.S. PATENT DOCUMENTS

| | | | | |
|---|---|---|---|---|
| 5,025,456 A | * | 6/1991 | Ota et al. ..................... | 375/318 |
| 5,475,342 A | * | 12/1995 | Nakamura et al. .......... | 330/136 |
| 5,923,219 A | * | 7/1999 | Ide et al. ..................... | 330/308 |
| 5,953,690 A | * | 9/1999 | Lemon et al. ............... | 702/191 |
| 6,292,058 B1 | * | 9/2001 | Ide et al. ..................... | 330/279 |
| 6,587,004 B2 | * | 7/2003 | Ide .............................. | 330/308 |
| 6,907,202 B1 | * | 6/2005 | Ide et al. ..................... | 398/208 |
| 6,909,082 B2 | * | 6/2005 | Doh et al. ............ | 250/214 AG |

FOREIGN PATENT DOCUMENTS

EP    1006653 A2    7/1999

* cited by examiner

*Primary Examiner*—Kenneth Vanderpuye
*Assistant Examiner*—Luis Garcia
(74) *Attorney, Agent, or Firm*—Cha & Reiter, L.L.C.

(57) ABSTRACT

A burst-mode optical receiver of a differential-output structure is disclosed. The burst-mode optical receiver includes a trans-impedance amplifier for converting currents indicating the burst-mode signals into voltage signals, a bottom-level detector for detecting the bottom level of signals outputted from the trans-impedance amplifier, an automatic gain controller for automatically adjusting a gain to prevent the output waveforms of the tran-simpedance amplifier from being distorted after receiving the bottom-level signals detected by the bottom-level detector, a top-level detector for detecting the top level of signals outputted from the trans-impedance amplifier, a pair of resistors for generating a signal-reference voltage from the bottom- and top-level voltages, one side of each resistor being connected to the bottom- and top-level detectors, respectively, and the other sides of each resistor being connected to each other, and a differential buffer for receiving outputs from the trans-impedance amplifier and the signal-reference voltage from the pair of resistors and for eliminating the offsets generated from the bottom- and top-level detectors in order to supply two differential outputs.

5 Claims, 9 Drawing Sheets

BURST-MODE OPTICAL RECEIVER OF DIFFERENTIAL OUTPUT STRUCTURE

CLAIM OF PRIORITY

This application claims priority to an application entitled "BURST-MODE OPTICAL RECEIVER OF DIFFERENTIAL OUTPUT STRUCTURE," filed in the Korean Intellectual Property Office on Apr. 15, 2002 and assigned Ser. No. 2002-20489, the contents of which are hereby incorporated by reference.

BACKGROUND OF THE INVENTION

1. Field of the Invention

The present invention relates to a burst-mode optical receiver and, more particularly, to a burst-mode optical receiver for enhancing an available bit rate in a passive network.

2. Description of the Related Art

For the future generation of communications, optical subscriber networks, such as FTTH (Fiber to the Home), will be required to install optical fiber lines directly to the homes of subscribers for the transmissions/reception of information at a higher speed. The subscriber networks have been traditionally constructed with copper-based lines. As such, it would be very costly to replace them with the fiber-based lines. In this regard, a passive optical network (PON) has been taken into consideration to provide a more cost-effective optical-subscriber network.

FIG. 1 illustrates a general PON system. As shown in FIG. 1, the PON is generally made up of an optical line termination (OLT) located in a central office, a 1×N passive optical splitter, a plurality of optical-network units (ONUs) corresponding to each subscriber. In this type of optical multi-access network, each node is designed to transmit data or packets to other nodes using a predetermined time slot. Typically, a plurality of subscribers can make use of a single optical line through which desired data are transmitted or received according to a time-division multiplexing scheme. Unlike the point-to-point link, burst-mode data are generated in which received data or packets have different sizes and phases from each other due to the optical loss or attenuation generated via different transmission routes. Each subscriber transmits data at the respective assigned time, but the packets received at the receiving ends are not uniform in size due to the path differences between the OLT and each subscriber.

As each received packet has a different size and phase due to the optical loss or by different transmission routes between the nodes, an optical receiver must be employed to compensate the loss. To this end, a burst-mode optical receiver is used to enable the received packets to have the same sizes and phases. The conventional burst-mode optical receivers prevent the loss of burst data caused by a charging/discharging time of the capacitor in the receiver by removing the DC block capacitor. A threshold value is extracted from each received packet by the receiver which functions as a reference signal for the purpose of data discrimination, and the data is amplified using the extracted discrimination reference signal.

For example, FIG. 2 is a circuit diagram of a conventional burst-mode optical receiver. The burst-mode optical receiver of FIG. 2 includes an optical detector 1 for converting input optical signals into current signals, and a trans-impedance amplifier (TIA) 2 for converting current signals passing through the optical detector 1 into voltage signals. Note that the TIA 2 is dc-coupled. Signals received by the optical detector 1 are amplified at the TIA 2 and then divided into two parts, of which one is dc-coupled to and inputted into a differential amplifier of a limiter amplifier 4 and the other is inputted into a circuit for an automatic threshold controller (ATC) 3. The ATC 3 extracts discrimination thresholds of the respective packets received from the TIA 2. The limiter amplifier 4 amplifies signals with a different optical intensity into signals having a constant amplitude using the extracted discrimination thresholds. The thresholds that vary according to the sizes of packets outputted from the ATC 3 are inputted into an input terminal as a reference voltage $V_{ref}$ of the differential amplifier of the limiter amplifier 4 to be amplified and recovered.

FIG. 3 is a circuit diagram of another conventional burst-mode optical receiver having a structure with a differential input/output feedback amplifier. The optical receiver of FIG. 3 includes an optical detector 8, a differential preamplifier 10, a peak detector 20, and a limiting amplifier 30. The peak detector 20 detects the peak value of an output signal to generate a reference voltage so as to set the discrimination thresholds of received packets. The limiting amplifier 30 amplifies recovered signals using the generated reference voltage. The differential preamplifier 10 is operative to receive current signals, which are detected at the optical detector 8, as inputs and then outputs corresponding voltages. A ratio of the input current to the output voltage, i.e., a trans-impedance, is determined by a feedback resistor $Z_T$. One side of the feedback resistor $Z_T$ is connected to a "+" input terminal of amplifier 12 and the other is connected to a "−" output terminal of amplifier 12. The peak detector 20 is made up of an amplifier 22, a drive transistor 24, a buffer transistor 26, a charging capacitor $C_{PD}$, and a bias circuit 28. Here, a reference voltage $V_{ref}$ which is outputted from the peak detector 20, is converted into a discrimination-threshold current by the feedback resistor $Z_T$.

During operation, the "+" input terminal of the amplifier 12 receives the current $I_{IN}$ outputted from the optical detector 8, and the "−" output terminal receives the reference voltage $V_{ref}$ or a reference signal. Here, the reference signal inputted to the "−" output terminal is a discrimination-threshold current converted from the reference voltage $V_{ref}$, which is detected from the peak detector 20. Accordingly, the differential preamplifier 10 generates output voltages $V_o^+$ and $V_o^-$ depending on the difference between the two input currents.

The output voltage $V_o^+$ outputted from the "+" terminal of the amplifier 12 in the differential preamplifier 10 is inputted to a "+" terminal of an amplifier 22 of the peak detector 20, whereas the reference voltage $V_{ref}$ applied to the "−" terminal of the amplifier 12 of the differential preamplifier 10 is fed back to a "−" terminal of the amplifier 22 of the peak detector 20. Therefore, when these two voltages are not the same at the amplifier 22 of the peak detector 20, the drive transistor 24 is turned on and causes the charging capacitor $C_{PD}$ to be charged with voltage until the "+" and "−" terminals of the amplifier 22 have the same voltage. Accordingly, when an optical-detection signal, first input $I_{IN}$, flows into the differential preamplifier 10, its output becomes $\Delta V_o^+ = \Delta V_o^-$. Further, as the peak detector 20 is supplied with the output of $\Delta V_o^+$ at its "+" terminal, the voltage charged at the charging capacitor $C_{PD}$ becomes the reference voltage $V_{ref}$. This reference voltage $V_{ref}$ is used as a threshold for discriminating data using a mean level of an output-data signal.

Meanwhile, when the two voltages are the same at the amplifier 22 of the peak detector 20, the drive transistor 24 is turned off, and thus the charging capacitor $C_{PD}$ is discharged. With this discharge, the buffer transistor 26 is turned on, and thus the current flows through the bias circuit 28. Thereafter, the reference voltage $V_{ref}$ is applied to a node between the buffer transistor 26 and the bias circuit 28 and then converted into a discrimination-threshold current by the feedback resistor $Z_T$, and finally fed back to the "−" terminal of the amplifier 12 of the differential preamplifier 10. Thus, the current flowing to the "−" terminal of the amplifier 22 of the peak detector 20 corresponds to a middle value of the optical-detection signal $I_{IN}$ current. Hence, the reference signal $V_{ref}$ functions as the discrimination threshold of the differential preamplifier 10.

However, the actual reference signal $V_{ref}$ is typically accompanied by an offset of the differential preamplifier 10, resulting from device asymmetry as well as a structural offset caused by the turn-on voltages of transistors resulting from a circuit structure of the peak detector 20. Thus the actual reference signal tends to deviate from a mean or middle level of the output data signal. A pulse width distortion is generated due to the change in the reference signal which in turn degenerates the sensitivity of the optical detector 8.

To minimize this pulse-width distortion, the conventional feedback burst-mode optical receiver employs a current source $I_{ADJ}$, which is connected to the "+" input terminal and the resistor $Z_T$ of the differential preamplifier 10. The current source $I_{ADJ}$ serves to compensate the offset generated by the differential preamplifier 10, but does not compensate the structural offset generated by the turn-on voltages of the transistors within the peak detector 20.

Accordingly, there is a problem in that the reference signal generated from the peak detector 20 is not matched with the mean level of the output-data signal, thus still generates a pulse-width distortion and degrades the sensitivity of the optical detector.

SUMMARY OF THE INVENTION

Accordingly, the present invention has been made to solve the above-mentioned problems occurring in the prior art and provides additional advantages, by providing a burst-mode optical receiver having a differential output structure capable of significantly reducing the pulse-width distortion while improving the reception sensitivity.

One aspect of the present invention provides an additional circuit for precisely adjusting the offsets caused by a peak detector, so that a reset signal is generated automatically and a reference-voltage signal is set exactly to a middle level.

Still another aspect is that the present invention may be realized in a simple, reliable, and inexpensive implementation.

Another aspect of the present invention provides a burst-mode optical receiver having a differential output structure and includes: a trans-impedance amplifier for converting currents indicating burst-mode signals into voltage signals; a bottom level detector for detecting the bottom level of signals outputted from the trans-impedance amplifier; an automatic gain controller for automatically adjusting a gain to prevent the output waveforms of the trans-impedance amplifier from being distorted after receiving the bottom-level signals detected by the bottom-level detector; a top-level detector for detecting the top level of signals outputted from the trans-impedance amplifier, a pair of resistors for generating a signal-reference voltage from the bottom- and top-level voltages, one side of each resistor being connected to the bottom- and top-level detectors, respectively, and the other sides of each resistor being connected to each other; and, a differential buffer for receiving outputs from the trans-impedance amplifier and the signal reference voltage from the pair of resistors and for eliminating the offsets generated from the bottom- and top-level detectors in order to supply two differential outputs.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Figure 4:
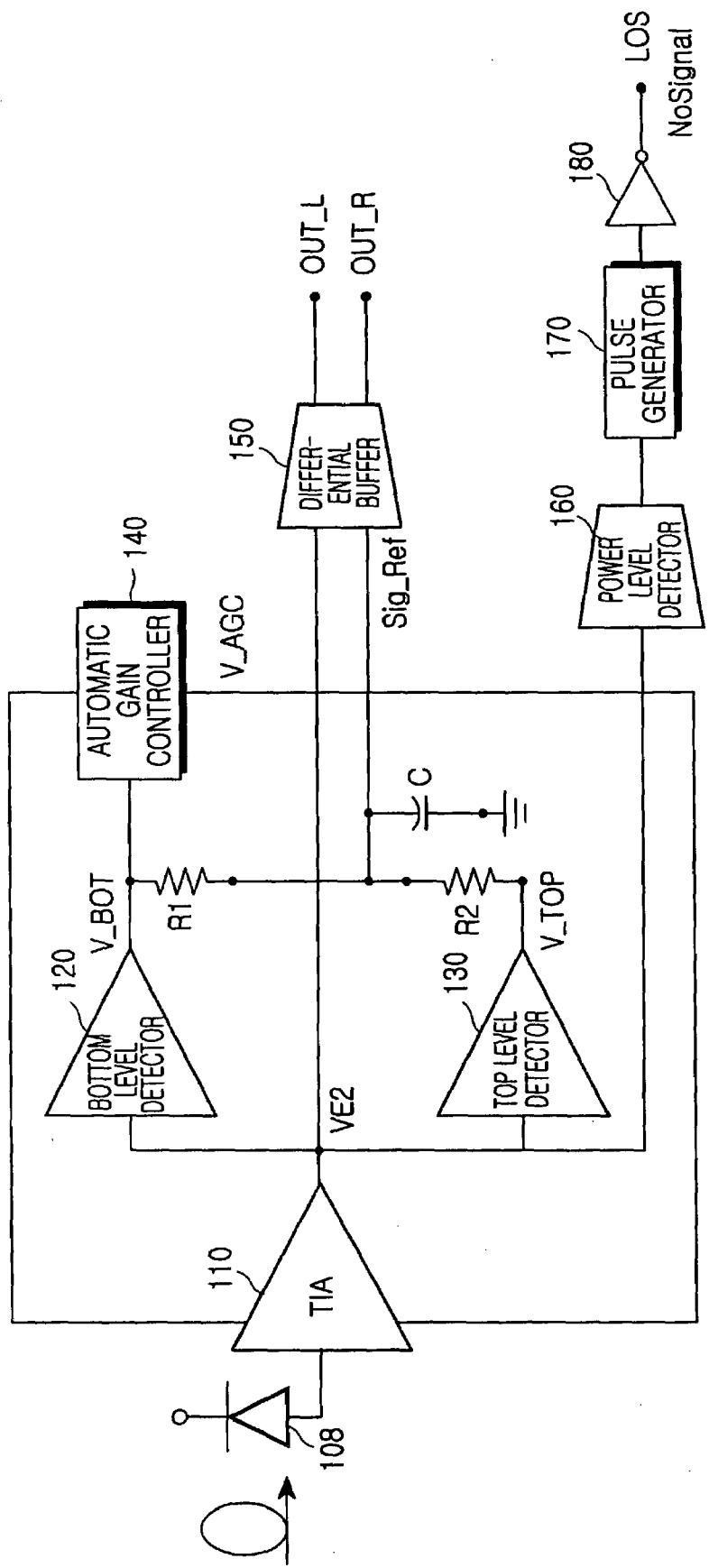
FIG. 4 is a circuit diagram of a burst-mode differential preamplifier of a differential-output structure according to the present invention.

FIG. 4 is a circuit diagram of a burst-mode differential preamplifier of a differential-output structure according to the teachings of the present invention. As shown, the burst-mode differential preamplifier includes an optical detector 108 for converting an in-put-burst optical signal into a current signal according to the signal intensity of the input-burst optical signal. The output of the optical detector 108 is connected to a trans-impedance amplifier (TIA) 110. The TIA 110 amplifies the current received from the optical detector 108 and supplies the amplified output signal VE2 to a bottom-level detector 120 and a top-level detector 130.

The bottom-level detector 120 detects a bottom level of the signal output from the TIA 110, and the top-level detector 130 detects a top level of the signal output from the TIA 110. The bottom voltage level detected from the bottom-level detector 120 is supplied to an automatic gain controller (AGC) 140 and, in response, the AGC 140 generates an AGC control signal. Note that a considerable signal distortion occurs if the input-current level received by the AGC 140 is beyond the range of −31 dBm to −16 dBm. To this end, the AGC operates to prevent the signal distortion, as explained hereinafter.

Figure 5:
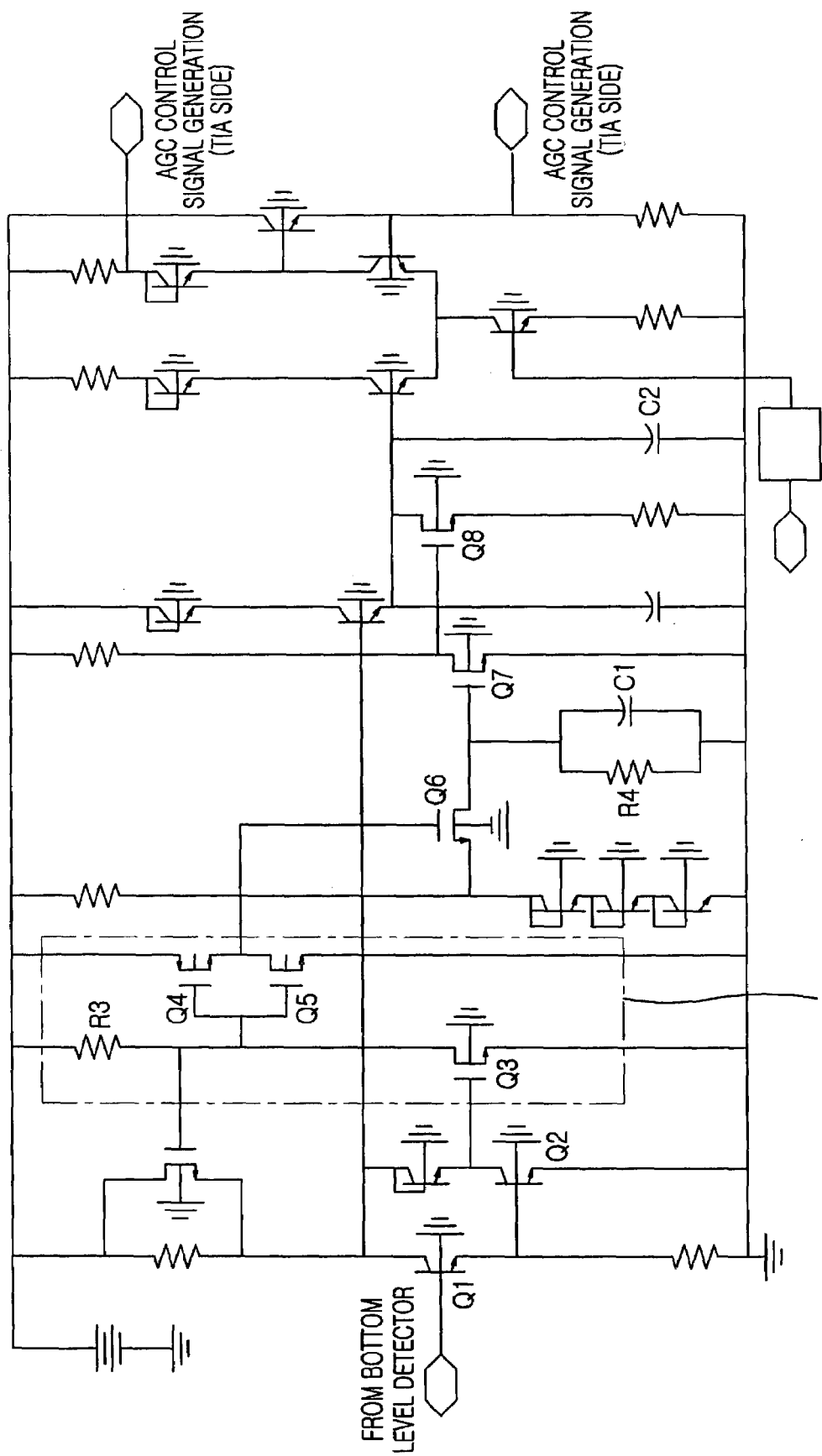
FIG. 5 is a circuit diagram of an automatic gain controller of FIG. 1.

FIG. 5 is a circuit diagram of an AGC 140 according to the embodiment of the present invention. As shown in the circuit diagram, the AGC 140 is constructed to generate the AGC control signal when a variation of input signal occurs and, in particular, when the transistors Q1 and Q2 are turned off by the bottom level of the output signal from the TIA 110. Normally, the signal received in the bottom-level detector 120 begins to be distorted at its bottom level during the amplification operation by the TIA 110. Thus, the AGC 140 begins to operate automatically whenever the output signal of the TIA 110 begins to be distorted. This way, the AGC 140 is able to compensate the gain characteristic based on the level of an input signal. To achieve this, the AGC 140 includes a signal-level-determining section 142 having a resistor R3 and transistors Q3, Q4, and Q5. The signal-level-determining section 142 is configured to analyze the bottom level of a signal input to the base of the transistor Q1 to determine whether the signal is present.

If it is determined that a signal is present, the signal-level-determining section 142 maintains a gate voltage of the transistor Q6 to be a "high" state and allows the transistor Q6 to be turned on, thus allowing a capacitor C1 to be charged to a predetermined voltage (i.e., 3× diode turn-on voltage). At the same time, a drain voltage of the transistor Q7 becomes a "low" state, which indicates the presence of a signal.

If it is determined that no signal is present, the signal-level-determining section 142 converts a gate voltage of the transistor Q6 into a "low" state. As a result, the transistor Q6 turns off and begins to be discharged. The transistor Q6 is kept turned off until the discharge time, which is an internal time-constant circuit formed by the capacitor C1 and the resistor R4 sets, lapses(T(time constant)=1/(R*C)). Then, the drain voltage of the transistor Q7 becomes a "high" state to show that no signal is present which also indicates the end of a packet transmission. This signal makes a transistor Q8 to be discharged and generates an AGC signal reset, so that the AGC voltage level can be reset at the beginning of the next packet transmission. Accordingly, it is possible to prevent a signal distortion problem either when the AGC-operation standard level is too low and the output of the TIA is reduced excessively, or when the AGC-operation standard level is too high.

Further, an initial AGC signal generated from a collector of the input transistor of the AGC 140 is set and maintained at a peak level by the peak detector 130 within the AGC 140, thereby an actual AGC control signal is set to be a constant value at the beginning of the packet transmission, which is maintained during the packet transmission. As a result, a jitter is minimized which is generated with a change of the AGC control signal during the packet transmission.

Referring to back to FIG. 4, the output terminal of the bottom-level detector 120 is connected to one side of a first resistor R1, and the other side of the resistor R1 is connected to a second resistor R2. Similarly, the output terminal of the top-level detector 130 is connected to one side of the second resistor R2, and the other side of the second resistor R2 is connected to the first resistor R1. These resistors R1 and R2 are used to get a precise middle-level voltage based on the outputs of the bottom-level voltage and the top-level voltage. These resistors R1 and R2 have their resistance values set to generate a middle-level voltage, i.e., a signal-reference voltage Sig-Ref, between the bottom-level voltage and the top-level voltage. A capacitor C is connected to the second resistor P2 in parallel.

Meanwhile, the resistors R1 and R2 have contacts connected to a differential buffer 150, so that the mean or middle-level voltage between the bottom-level voltage and the top-level voltage is supplied to the differential buffer 150. Note that in a burst-mode operation, the middle-level voltage functions as a reference signal for detecting data. Further, the differential buffer 150 is connected to the output terminal of the TIA 110, so that it is supplied with the output signal VE2. The differential buffer 150 is operative to reduce offset errors, which are generated from the bottom- and top-level detectors 120 and 130, as explained hereinafter.

Figure 6:
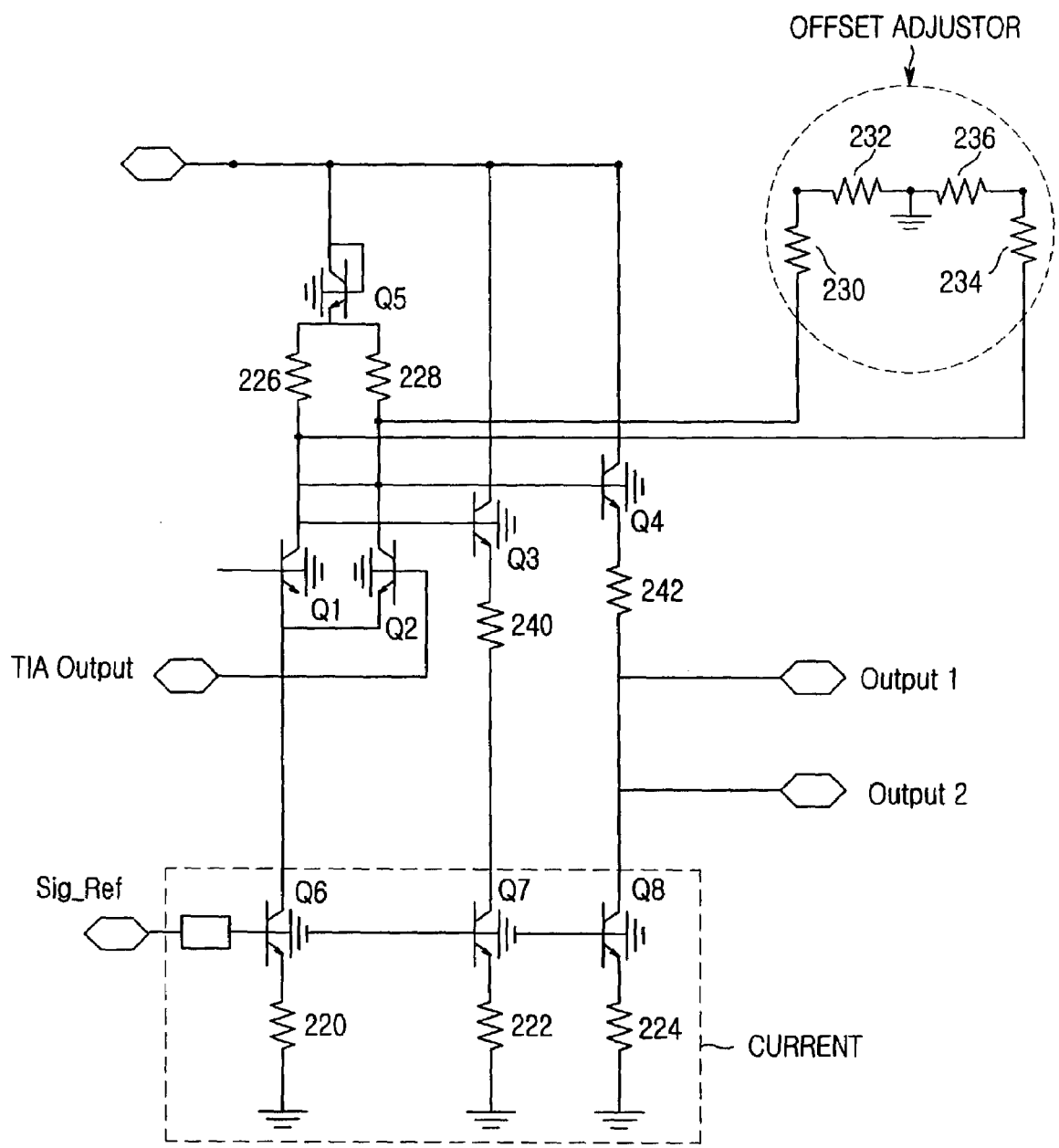
FIG. 6 is a circuit diagram of a differential buffer of FIG. 1.

FIG. 6 is a circuit diagram of a differential buffer 150 according to the embodiment of the present invention. As shown, the output from the TIA 110 is applied to a base of the transistor Q1, and the signal reference voltage Sig-Ref indicative of the value between the bottom-level voltage and the top-level voltage is applied to a base of the transistor Q2. These transistors Q1 and Q2 are formed into a differential amplifier. A power source is supplied to the respective transistors Q1 and Q2 through a transistor Q5. Collectors of the transistors Q1 and Q2 are connected to bases of the transistors Q3 and Q4, respectively. Further, the differential buffer 150 includes a current source 152 (not shown). Emitters of the transistors Q6, Q7 and Q8 are connected to the ground through resistors 220, 222 and 224, respectively. The current source 152 functions to adjust the amount of current of an emitter terminal constantly. Transistors Q3 and Q4 allow two outputs of the differential amplifier, which is made up of transistors Q1 and Q2, to be outputted through the respective emitters. In order to allow the differential buffer 150 to reduce the offset errors, which are generated from the bottom- and top-level detectors 120 and 130, an offset adjustor 252 is provided which includes resistors 230, 232, 234 and 236.

Referring back to FIG. 4, a power-level detector 160 is provided for detecting the power level of an input signal. The power-level detector 160 determines whether or not a final output or the output-data (+,−) level is present from an output signal of the TIA 110 and provides the determined resultant to a pulse generator 170. That is, the power-level detector 160 determines whether or not the final output signal is present and generates a signal related to a loss of signal (LOS). Then, the pulse generator 170 generates a pulse depending on the determined resultant provided from the power-level detector 160.

According to the present invention, the top- and bottom-level detectors are each designed to have a short time constant, so that the time constant can be automatically reset between the sequential packets and the two detectors can be operated without a separate reset signal, which was generated by the ATC circuit in the prior art. As a result, the capacitors in the chip have a reduced area when compared with those employed in the reset signal-generation circuit of the prior art. Moreover, the differential-output signals are generated by using the differential buffer with respect to a single input, thereby minimizing the additional circuits necessary to perform the same functions. Furthermore, a precise signal standard can be adjusted, because the circuit has an offset adjustment function.

Figure 7:
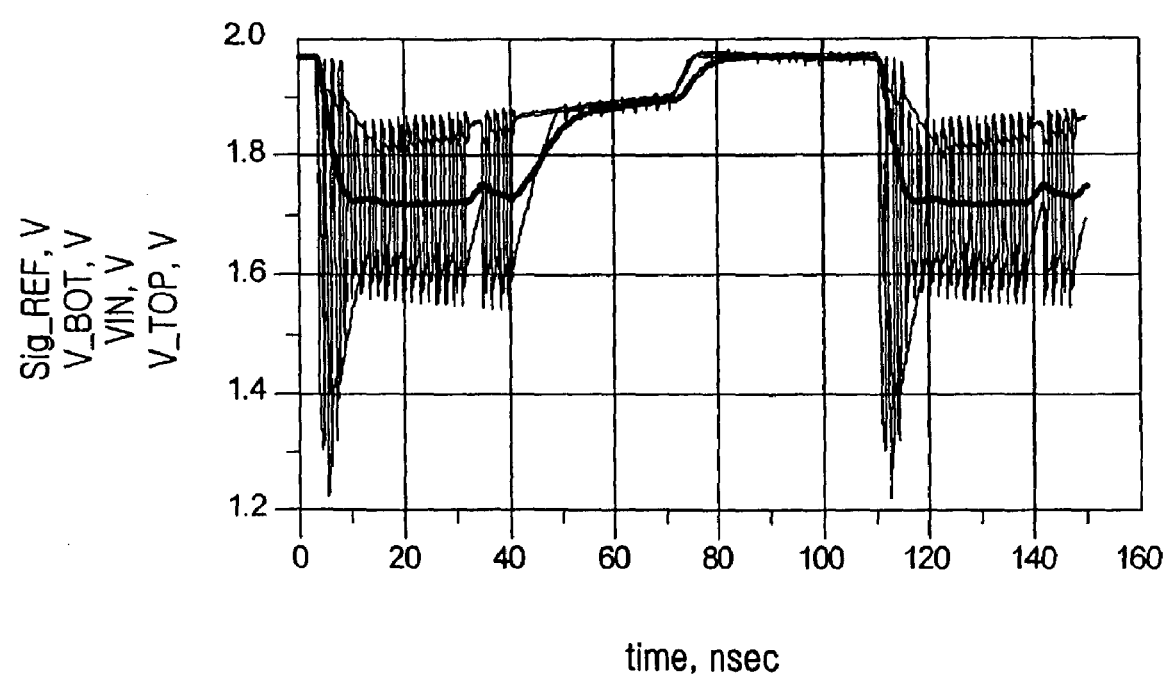
FIG. 7 is a diagram showing the output waveforms of a top-level voltage, a bottom-level voltage, and a reference voltage, all of which are detected at a burst-mode differential preamplifier having a differential-output structure according to the present invention.
Figure 8:
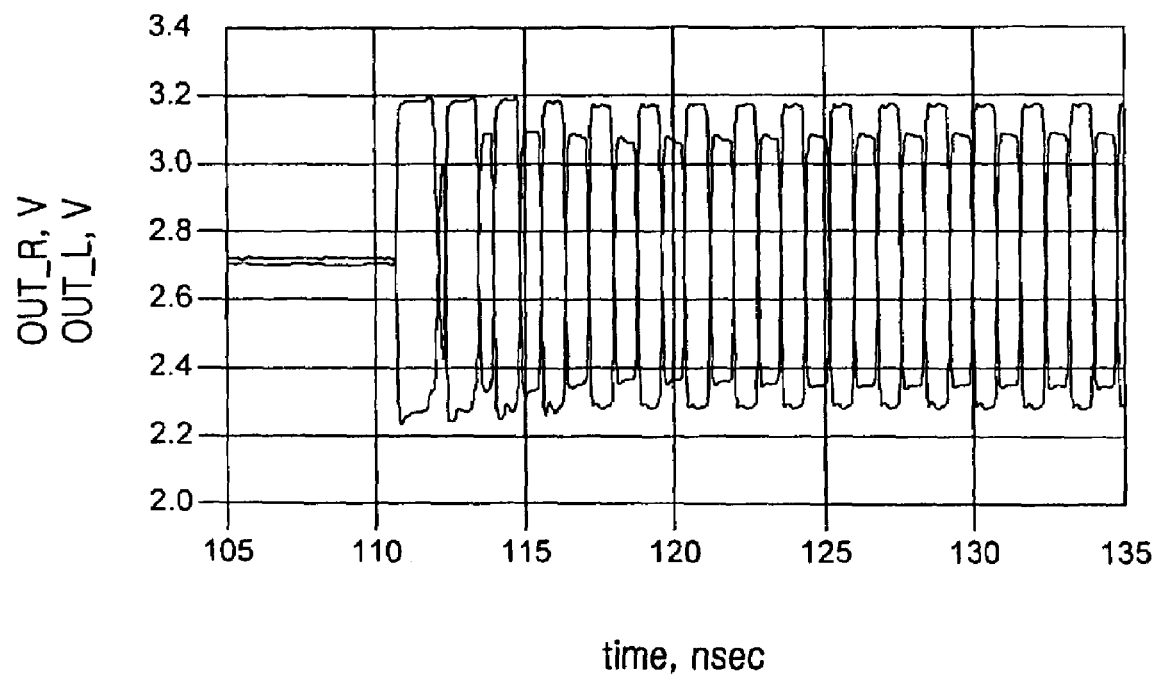
FIG. 8 is a diagram showing waveforms of differential-output voltages from a burst-mode differential preamplifier having a differential-output structure according to the present invention; and, FIG. 9 is a diagram showing waveforms of an output voltage of TIA, an LOS signal, an AGC control signal, and outputs of a differential buffer in a burst-mode differential preamplifier having a differential-output structure according to the present invention.
Figure 9:
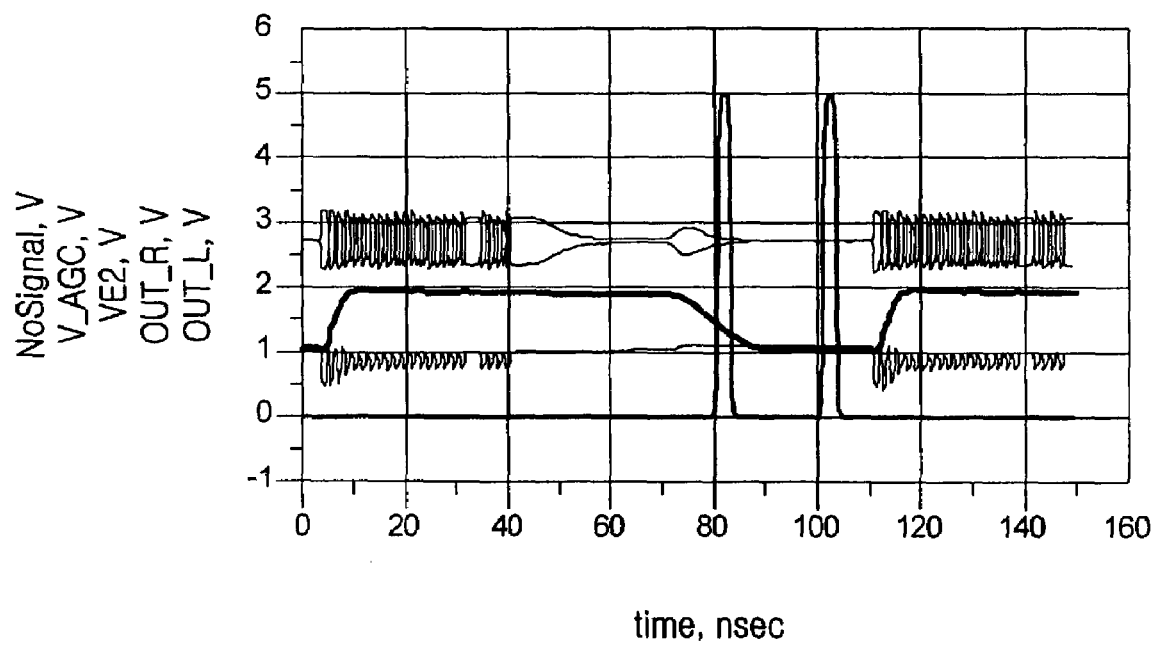

FIGS. 7–9 represent the signal output characteristics illustrating the advantages of the optical receiver according to the teachings of the present invention.

Figure 1:
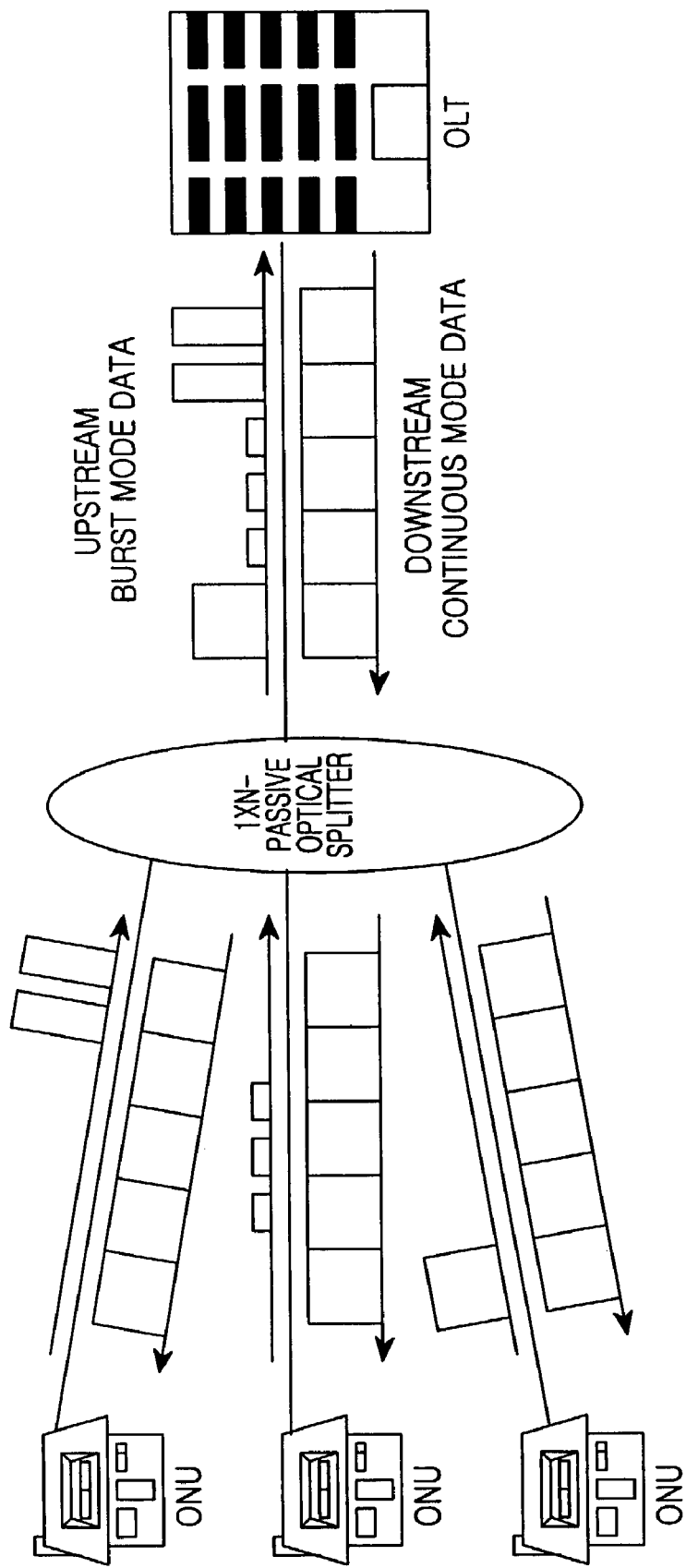
FIG. 1 illustrates a passive optical-communication system.
Figure 2:
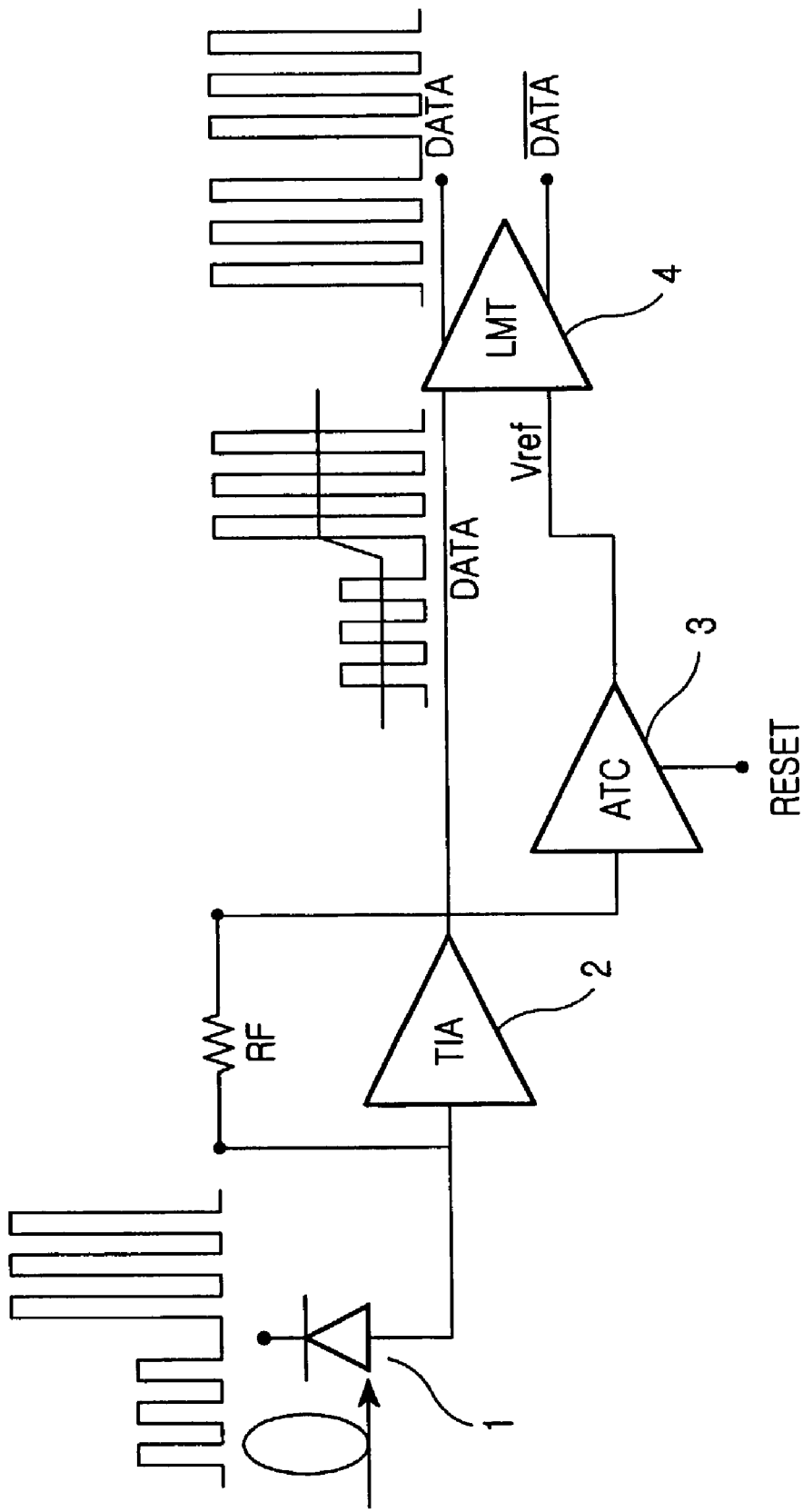
FIG. 2 is a circuit diagram of a conventional burst-mode optical receiver.
Figure 3:
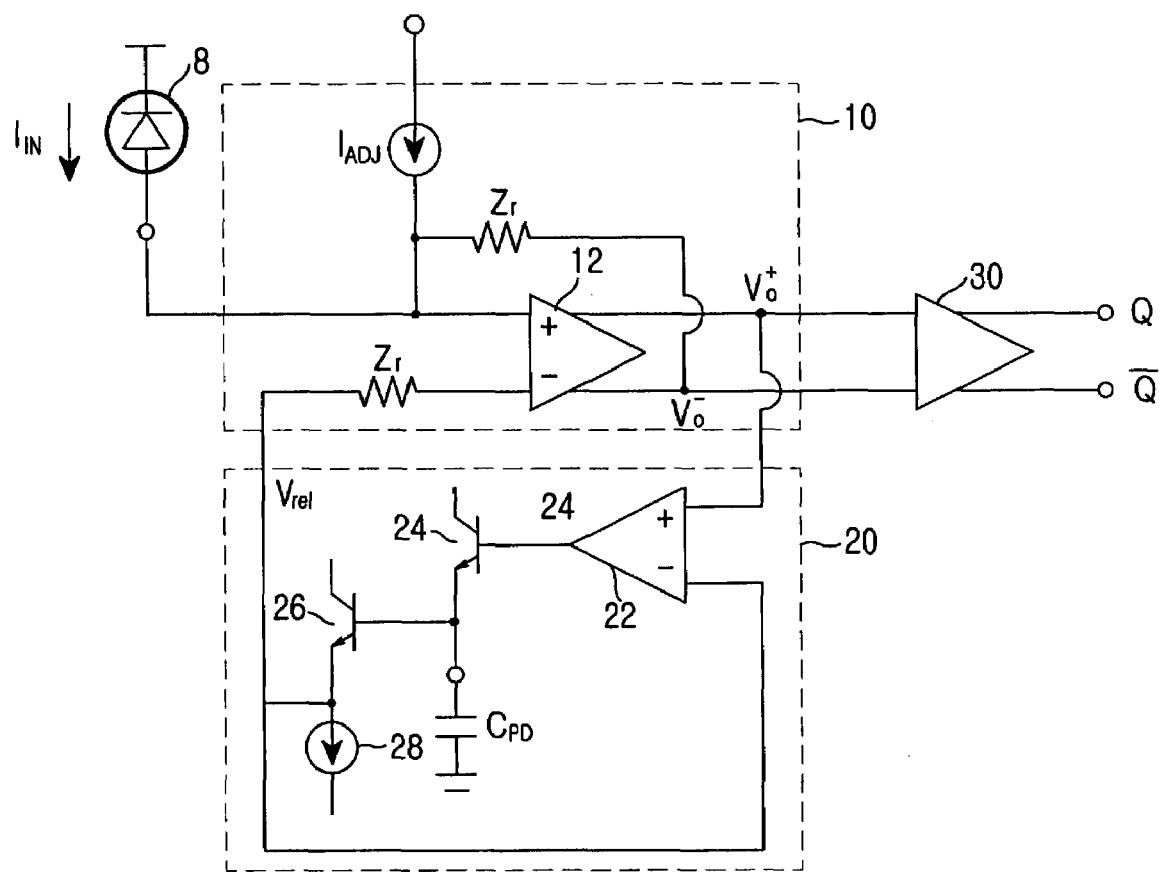
FIG. 3 is a circuit diagram of another conventional burst-mode optical receiver having a structure of a differential input/output feedback amplifier.

In particular, FIG. 1 is a diagram showing the output waveforms of the top-level voltage, the bottom-level voltage, and a reference voltage, all of which are detected at a burst-mode differential output preamplifier according to the present invention. The longitudinal axis represents the voltage level and the transverse axis represents time (by ns).

In this drawing, a symbol of Vin is a signal representing the current outputted from the optical detector 108 and inputted to the TIA 110. The TIA 110 amplifies the inputted current to output the amplified current. The symbol of Vbot represents the bottom level that the bottom-level detector 120 detects from signals supplied from the TIA 110, and a symbol of Sig_REF represents the reference voltage generated by resistors R1 and R2 to which the bottom- and top-level voltages are applied. As shown in FIG. 7, the reference voltage corresponds almost exactly to the mean level between the top level and the bottom level.

FIG. 8 is a diagram showing the waveforms of differential-output voltages from a burst-mode differential preamplifier of a differential-output structure according to the present invention. That is, these waveforms represent two output signals outputted through the differential buffer 150. Note that these two output signals have different polarities which are inverse to each other.

FIG. 9 is a diagram showing the waveforms of an output voltage of the TIA 110, an LOS signal, an AGC control signal, and outputs of a differential buffer in a burst-mode differential preamplifier of a differential-output structure according to the present invention. As shown, the waveform shown on the lowest side represents the LOS signal, which is generated when no output is present from the TIA 110. The waveform shown just above the LOS signal is the waveform representing the output voltage of the TIA 110. Finally, two waveforms shown on the upper side represent the waveforms of differential-output voltages shown in FIG. 8. As can be seen from FIG. 9, the AGC control signal has a varying value according to the outputs of the TIA 110.

As can be seen from the foregoing, according to the present invention, the signal-reference voltage Sig_Ref is generated within the burst-mode optical receiver, and the differential-output signals are generated through the internal differential buffer. As a result, there is no need for a separate circuit for the automatic threshold controller (ATC) as in the prior art, thus the area of the whole circuit can be reduced and the whole system can be easily constructed.

What is claimed is:

1. A burst-mode optical receiver of a differential-output structure comprising:
   a trans-impedance amplifier for converting currents indicative of burst-mode signals into voltage signals;
   a bottom-level detector for detecting the bottom level of output signals from the trans-impedance amplifier;
   a top-level detector for detecting the top level of output signals from the trans-impedance amplifier;
   an automatic gain controller coupled to the bottom-level detector for automatically adjusting a gain of the signal output from the bottom level in order to prevent the output signals of the trans-impedance amplifier from being distorted;
   a pair of resistors coupled to the outputs of the bottom- and top-level voltages for generating a signal-reference voltage, one side of each resistor coupled to the bottom- and top-level detectors and the other sides of each resistor coupled to each other; and,
   a differential buffer for receiving outputs from the trans-impedance amplifier and the signal-reference voltage generated by the pair of resistors and is operative to eliminate offsets generated from the bottom- and top-level detectors,
   wherein the automatic gain controller further comprises a signal-level-determining section for determining whether or not a signal is present by analyzing the bottom level from the bottom-level detector, a drive transistor for activating according to the determined resultant of the signal-level-determining section, and at least one transistor for indicating whether or not the signal is present by means of capacitors, which carry out charging/discharging voltage applied by the drive transistor.

2. The optical receiver according to claim 1, wherein the signal-reference voltage is a mean value between the top- and bottom-signal levels.

3. The optical receiver according to claim 1, further comprising a power-level detector for generating a signal indicating a loss of signal by determining whether or not output signals are present from the trans-impedance amplifier.

4. The optical receiver according to claim 1, wherein the differential buffer comprises a differential amplifier that inputs signals output from the trans-impedance amplifier and that inputs the signal-reference voltage, and comprises an offset adjustor, provided with a plurality of resistors, for reducing offset errors generating from the top- and bottom-level detectors.

5. The optical receiver according to claim 4, wherein the resistors are coupled in series.

* * * * *